United States Patent
Ashikhmin

(10) Patent No.: US 7,995,668 B2
(45) Date of Patent: Aug. 9, 2011

(54) METHOD AND APPARATUS FOR QUANTIZING COMPLEX VECTORS IN COMMUNICATION SYSTEM

(75) Inventor: Alexei Ashikhmin, Morristown, NJ (US)

(73) Assignee: Alcatel Lucent, Paris (FR)

( * ) Notice: Subject to any disclaimer, the term of this patent is extended or adjusted under 35 U.S.C. 154(b) by 1078 days.

(21) Appl. No.: 11/766,927

(22) Filed: Jun. 22, 2007

(65) Prior Publication Data

US 2008/0316975 A1 Dec. 25, 2008

(51) Int. Cl.
*H04B 7/02* (2006.01)
*H04L 23/02* (2006.01)

(52) U.S. Cl. ........................ 375/265; 375/267
(58) Field of Classification Search ............... 375/260, 375/262, 265, 267
See application file for complete search history.

(56) References Cited

U.S. PATENT DOCUMENTS

| 2005/0265290 A1 | 12/2005 | Hochwald et al. | |
|---|---|---|---|
| 2007/0206626 A1* | 9/2007 | Lee et al. | 370/437 |
| 2008/0080449 A1* | 4/2008 | Huang et al. | 370/342 |
| 2008/0081669 A1* | 4/2008 | Kwon et al. | 455/561 |
| 2008/0165875 A1* | 7/2008 | Mundarath et al. | 375/262 |
| 2008/0299917 A1* | 12/2008 | Alexiou et al. | 455/103 |

OTHER PUBLICATIONS

J.K. Wolf, "Efficient Maximum Likelihood Decoding of Linear Block Codes Using Trellis," IEEE Transactions on Information Theory, Jan. 1978, pp. 76-80, vol. 24, No. 1.
D. Chase, "A Class of Algorithms for Decoding Block Codes with Channel Measured Information," IEEE Transactions on Information Theory, Jan. 1972, pp. 170-182, vol. IT-18, No. 1.

* cited by examiner

*Primary Examiner* — David B Lugo
(74) *Attorney, Agent, or Firm* — Ryan, Mason & Lewis, LLP

(57) ABSTRACT

Improved techniques are disclosed for quantizing complex vectors in communication systems. For example, a method includes the following steps. At least one complex vector representative of at least one element of a communication system is obtained. A codeword that approximates the complex vector is identified. The identified codeword is a codeword, from a set of codewords, wherein a real part of a product of the codeword and a scaled version of the complex vector is about maximal over the set of codewords. The scaled version of the complex vector is the product of the complex vector and a constant from a set of constants. In one embodiment, the element of the communication system that the complex vector represents is a channel between a base station and a user terminal in the communication system.

20 Claims, 3 Drawing Sheets

100

200

METHOD AND APPARATUS FOR QUANTIZING COMPLEX VECTORS IN COMMUNICATION SYSTEM

FIELD OF THE INVENTION

The present invention generally relates to communication systems and, more particularly, to techniques for quantizing complex vectors in such communication systems.

BACKGROUND OF THE INVENTION

Quantizers of complex vectors find numerous applications in communication systems. A typical example is a multiple-input, multiple-output (MIMO) communication system. In a typical MIMO communication system, a multi-antenna array in a base station sends multiple data streams selectively and simultaneously to autonomous single-antenna terminals, also referred to as "users," thereby achieving throughput gains relative to a set of single-antenna links. Multi-user systems of this type are sometimes referred to as MIMO broadcast systems.

One drawback of multi-user MIMO systems is that the base station has to know the propagation characteristics of the forward channel. The process through which the base station obtains this information is generally referred to as training. See, for example, U.S. Patent Application Publication No. 2005/0265290 to Hochwald et al. entitled "Feedback Method for Channel State Information of a Wireless Link," which is commonly assigned herewith and incorporated by reference herein.

Each of the single-antenna terminals may generate forward channel state information in the form of a corresponding channel vector which characterizes the channel between the base station and that terminal. The channel vectors may be based on measurements made by the terminals using pilot signals transmitted by the base station over the forward channel. Each terminal actually identifies a code vector (or codeword) from a predefined codebook that maximizes a product of the code vector and the channel vector which characterizes the channel between the base station and that terminal. The codeword is thus considered a quantization (approximation) of the channel vector. The terminals transmit their identified code vectors back to the base station over the reverse channel.

The base station uses the identities of the code vectors received from the terminals to precode data in order to improve MIMO data transmissions. However, when components of the code vectors are complex, such measurements require extensive receiver overhead in hardware, software, and/or processing time.

Accordingly, a need exists for improved techniques for quantizing complex vectors in communication systems such as MIMO broadcast systems.

SUMMARY OF THE INVENTION

Principles of the invention provide improved techniques for quantizing complex vectors in communication systems.

For example, in one aspect of the invention, a method includes the following steps. At least one complex vector representative of at least one element of a communication system is obtained. A codeword that approximates the complex vector is identified. The identified codeword is a codeword, from a set of codewords, wherein a real part of a product of the codeword and a scaled version of the complex vector is about maximal over the set of codewords. The scaled version of the complex vector is the product of the complex vector and a constant from a set of constants.

Further, the identifying step may further include the following steps. For each constant in the set of constants, a vector is computed as a product of the constant and the complex vector. For each computed vector, input values to a selected decoding algorithm are computed, wherein the computed input values are real. For each set of input values, the selected decoding algorithm is executed to generate a decoding result. A maximal decoding result is determined from decoding results of each of the sets of input values, wherein the codeword that approximates the complex vector is identified as the codeword associated with the maximal decoding result.

In one embodiment, the element of the communication system that the complex vector represents is a channel between a base station and a user terminal in the communication system. Thus, the user terminal performs the complex vector obtaining step and the codeword identification step, and may then transmit an index corresponding to the identified codeword to the base station. The base station may then utilize the index to reconstruct the complex vector representative of the channel between the base station and the user terminal such that an information transmission rate between the base station and the user terminal is increased. In one embodiment, the communication system is a multiple-input, multiple-output (MIMO) broadcast system.

In another aspect of the invention, a method includes generating a codebook including codewords, wherein a codeword in the codebook is identifiable as an approximation of a complex vector representative of at least one element of a communication system when a real part of a product of the codeword and a scaled version of the complex vector is about maximal over the codebook, wherein the scaled version of the complex vector is the product of the complex vector and a constant from a set of constants.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Principles of the present invention will be illustrated below in conjunction with exemplary multi-user MIMO systems and associated techniques for quantizing complex channel vectors. It should be understood, however, that the invention is not limited to use with any particular type of communication system or type of complex vector. The disclosed techniques are suitable for use with a wide variety of other communication systems which utilize various types of complex vectors, and in numerous alternative applications. By way of example only, in some relay assisted communication systems, a relay quantizes vectors transmitted by the source and then transmits the quantized version of the vectors to the destination.

Aspects of the present invention may be implemented in otherwise conventional wireless networks such as cellular, Wi-Fi or WiMax networks, or in a wide variety of other types of wireless communication systems. The term "base station" as used herein is therefore intended to be construed broadly so as to encompass, by way of example, an access point of a wireless network, or any other type of wireless communication system entity which utilizes MIMO techniques to communicate with multiple users.

Figure 1:
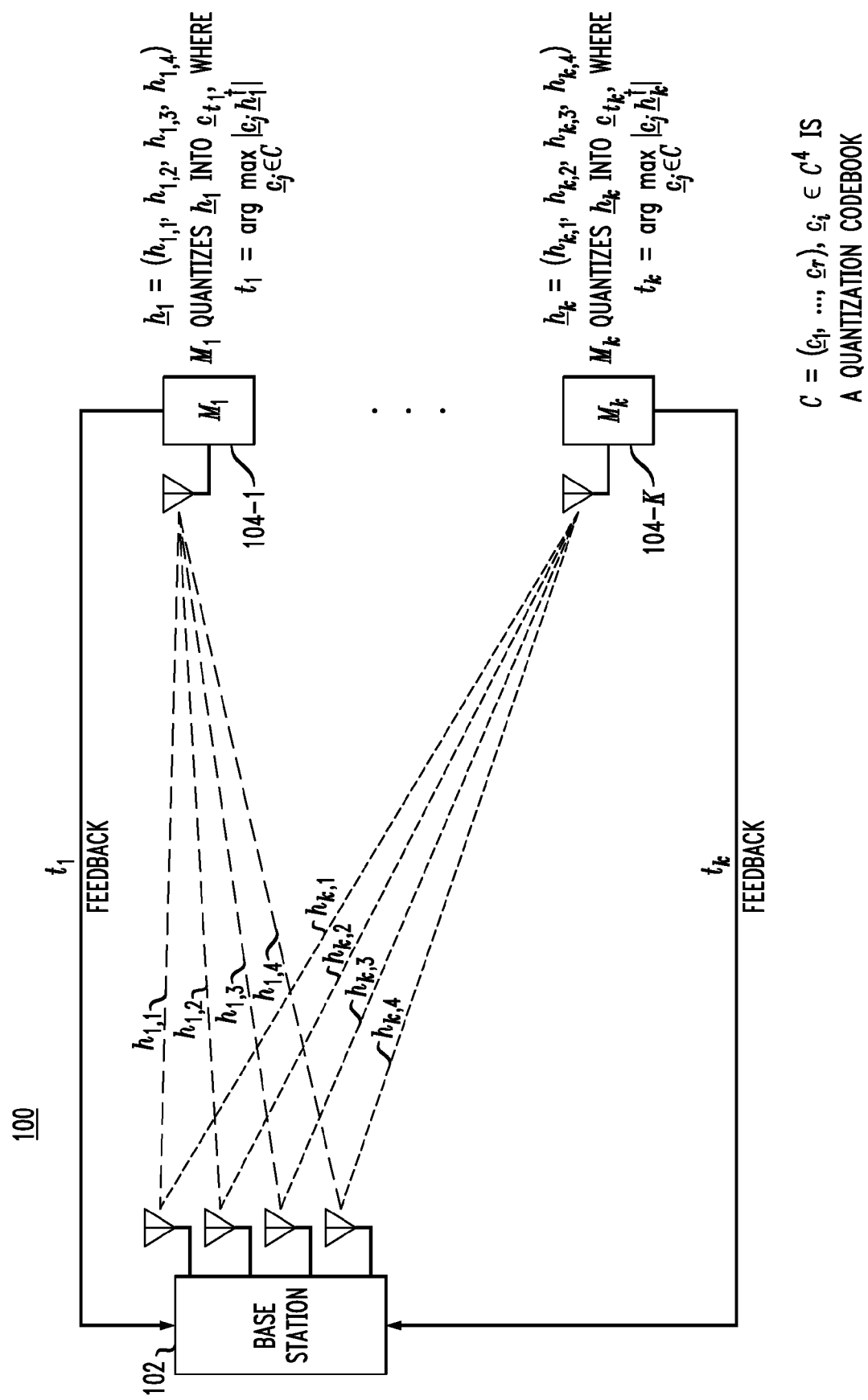
FIG. 1 shows a multiple-input, multiple-output communication system for implementing an embodiment of the invention.

FIG. 1 shows a MIMO broadcast communication system with feedback. In MIMO system 100, base station 102 is equipped with M transmitting antennas. The base station transmits independent messages to K terminals (receivers or mobiles), denoted as 104-1 through 104-K. Each of the K terminals is equipped with one antenna.

Base station 102 transmits signal $x_j \in C$ from the j-th antenna. So it can be stated that the base station transmits a vector $x=(x_1, \ldots, x_M) \in C^M$. During transmission from the i-th antenna to the m-th terminal, the signal $x_j$ is multiplied by the channel coefficient $h_{m,j}$. Thus, the terminal m receives the signal $y_m = h_m x^\dagger + w_m$, where $h_m = (h_{m,1}, \ldots, h_{m,M}) \in C^M$ is the channel vector of the m-th terminal and $z_m$ is an additive noise. It is to be understood that row vectors are denoted herein by boldface letters, and transposition and complex conjugation of complex vectors by †. The entries of $h_m$, m=1, K, and $w_m$, m=1,K, are independent complex Gaussian variables CN(0, 1). The power of the transmitted vector x can not exceed P, i.e., $E[\|x\|^2] \leq P$.

In the beginning of each communication session, the base station sends pilot signals to the terminals. Again, this is referred to as training. The terminals use the pilot signals to estimate their channel vectors $h_m$. The m-th terminal decodes its channel vector $h_m$ using a predefined codebook $C=\{c_1, c_2, \ldots, c_r\}, c_i \in C^M$. That is, the m-th terminal computes:

$$t_m = \underset{c_i \in C}{\operatorname{argmax}} |h_m c_i^\dagger|^2. \quad (1)$$

The code vector $c_{t_m}$ is a quantized (approximated) version of the channel vector $h_m$. Note that the decoding rule defined in equation (1) is a maximum likelihood decoding.

Next the m-th terminal transmits the index $t_m$ to the base station. The indices $t_m$, m=1, . . . , K allow the base station to reconstruct the quantized versions $c_{t_1}, \ldots, c_{t_K}$ of the channel vectors $h_1, \ldots, h_K$ respectively. The base station uses the knowledge of the quantized versions of the channel vectors to increase information transmission rate.

It is well known and intuitively clear that, for achieving sufficient quantization (approximation) quality, the codebook $C=\{c_1,c_2, \ldots, c_r\}$ has to have many code vectors, in other words r should be large. One of the main problems that prevents one from using codebooks of large sizes is that the maximum likelihood decoding defined in equation (1) becomes prohibitively complex as r grows.

It is well known that in the case of information transmission (not quantization) some codes, including codes of very large sizes, can be decoded very efficiently. Typical communication scenario in this case is the following. Let $V=\{v_1, \ldots, v_r\}$ be a code over a finite alphabet $A=\{a_1,a_2, \ldots, a_q\}$, that is entries $v_j$ of any code vector $v=(v_1, \ldots, v_M)$ belong to A. Assume that we want to transmit a code vector $v=(v_1, \ldots, v_M) \in V$. To do this we replace elements $\{a_1,a_2, \ldots, a_q\}$ of A with signals that can be physically transmitted via a given channel media. For example, in the case of wireless transmission, we replace $a_1, \ldots, a_q \in A$ with complex signals $s_1, \ldots, s_q \in C$, and in the case of fiber optical transmission, we replace $a_1, \ldots, a_q \in A$ by real signals $s_1, \ldots, s_q \in R$. As a result of this replacement, we obtain the codebook $C=\{c_1, \ldots, c_r\}$. We will assume that $c_i$ is obtained from $v_i$.

Example 1. Let $A=\{0,1,2,3\}$ and $V=\{(0,0,0),(1,2,3),(2,3,1),(3,1,2)\}$.

If we replace elements of A with the complex signals $s_1=1$, $s_2=i$, $s_3=-1$, $s_4=-i$ (here $i=\sqrt{-1}$), then we obtain:

$C\{(1,1,1),(i,-1,-i),(-1,-i,i),(-i,i,-1)\}$.

If we want to transmit a code vector $v=(v_1, \ldots, v_M) \in V$, we find the corresponding code vector $c=(c_1, \ldots, c_M)$ in C and transmit it via a noisy channel. On the other end of the channel, we receive a vector $h=(h_1, \ldots, h_M)$. To decode h, we compute the input values of the decoder:

$z_{i,j}=\log Pr(c_j=s_i|h_j)=\log Pr(v_j=a_i|h_j)$, $i=1, \ldots, q; j=1, \ldots, M$, and apply any decoding algorithm applicable for the code V. An advantage of codes over finite alphabets is that there exist many efficient algorithms for their decoding. For instance, if elements $a_1, \ldots, a_q$ form a finite field GF(q), or more generally an additive group G, we can build a code trellis for V and conduct an ML (Maximum-Likelihood) decoding using the Viterbi algorithm (see, e.g., J. K. Wolf, "Efficient Maximum-Likelihood Decoding of Linear Block Codes Using Trellis," IEEE Trans. Inform. Theory, vol. 24, pp. 7680, 1978) using values $z_{i,j}$ as the trellis branch metrics. The complexity of this decoding is proportional to $q^{M-k}$, $k=\log_q r$, which can be significantly smaller than the straightforward approach, whose complexity is proportional to r. Another possibility is to use the Chase decoding (see, e.g., D. Chase, "A Class of Algorithms for Decoding Block Codes with Channel Measured Information," IEEE Trans. Inform. Theory, vol. 18, pp. 170-182, 1972). There are many other efficient decoding techniques for codes over finite alphabets.

Let us consider now the quantization scenario. Similar to the information transmission case, we use a codebook $V=(v_1, \ldots, v_r)$ over a finite alphabet $A=\{a_q, \ldots, a_q\}$. We replace elements of A with complex signals $s_1, \ldots, s_q$ and obtain the codebook $C=\{c_1, \ldots, c_r\}$. We assume that the code vector of $c_i$ is obtained from $v_i$.

According to the decoding rule expressed above in equation (1), for a given complex vector h, a decoder is supposed to find the code vector $c \in C$ that gives the largest (or at least large) value $|hc^\dagger|$. Unfortunately, the known efficient decoding algorithms of V are not immediately applicable in this case. The reason for this is that, unlike the information transmission scenario, we can not compute the probabilities log $Pr(c_j=s_i|h_j)$, instead, according to equation (1), we must work with complex values $h_1, \ldots, h_M$.

To show that this is indeed a problem, let us consider the Viterbi decoding. One possible approach is to form the input values of the decoder as $z_{i,j}=h_j s_i^\dagger$. The problem is that values $z_{i,j}$ are not real, but complex. Let two codewords $c=(c_1,c_2, \ldots, c_M)$ and $c'=(c'_1,c'_2, \ldots, c'_M)$ belong to trellis paths that go through the same trellis node at time t. Define $S_p=\Sigma_{j=1}^t h_j \cdot c_j^\dagger$ and $S'_p=\Sigma_{j=1}^t h_j c'_j^\dagger$. Then, unlike the standard case, the fact that $|S_p|$ is bigger than $|S'_p|$ does not necessarily mean that $|hc^\dagger|>|hc'^\dagger|$, as the value of $|hc^\dagger|$ depends also on the phase of $S_p$ and on the phase of $S_f=\Sigma_{i=t+1}^M h_j c_i$.

Principles of the invention provide a solution to this problem in the following manner:

For any codebook C, we have:

$$\arg_C \max_{c_i \in C} |hc_i^\dagger| = \arg_C \max_{\alpha \in [0, 2\pi]} \max_{c_i \in C} |\Re((e^{i\alpha} hc_i^\dagger))|$$

Let $c^R$ and $c^I$ be the real and imaginary parts of $c \in C$. It is easy to see that:

$$\Re(hc^\dagger) = \sum_{j=1}^{m} h_j^R c_j^R + h_j^I c_j^I.$$

Thus, a decoding of h can be organized as follows. First, for all $\alpha \in [0, 2\pi]$, we compute vectors $q = e^{i\alpha} h$, where $e^{i\alpha}$ is an infinite set of constants since there are theoretically infinite many $\alpha$ in $\alpha \in [0, 2\pi]$. Second, for each q, we compute the input values of the decoder:

$$z_{i,j} = s_i^R q_j^R + s_i^I q_j^I,$$

i=1, ..., q; j=1, ..., M.

Third, we use any decoding algorithm of the code V with the decoder's input values $z_{i,j}$. Note advantageously that $z_{i,j}$ are real and therefore we do not have any problems with using any decoder of the code V. Finally, we choose the best result among all the decodings.

Note that if we use an ML decoding algorithm of the code V at the third step, this procedure becomes equivalent to the decoding defined in equation (1) and thus it is an ML decoding of the complex vector h.

The above-described procedure may not be the easiest to implement under all conditions since it calls for computing and decoding of infinitely many vectors $q = e^{i\alpha} h$, $\alpha \in [0, 2\pi]$ since, as explained above, there is theoretically an infinite number of $\alpha$'s between 0 and $2\pi$. Accordingly, below we describe an embodiment that may be implemented more easily in practice by using a finite set of constants.

Let D be a decoding algorithm of V that works with real input values of the decoder. For example, D could be the Viterbi decoding or Chase decoding.

Figure 2:
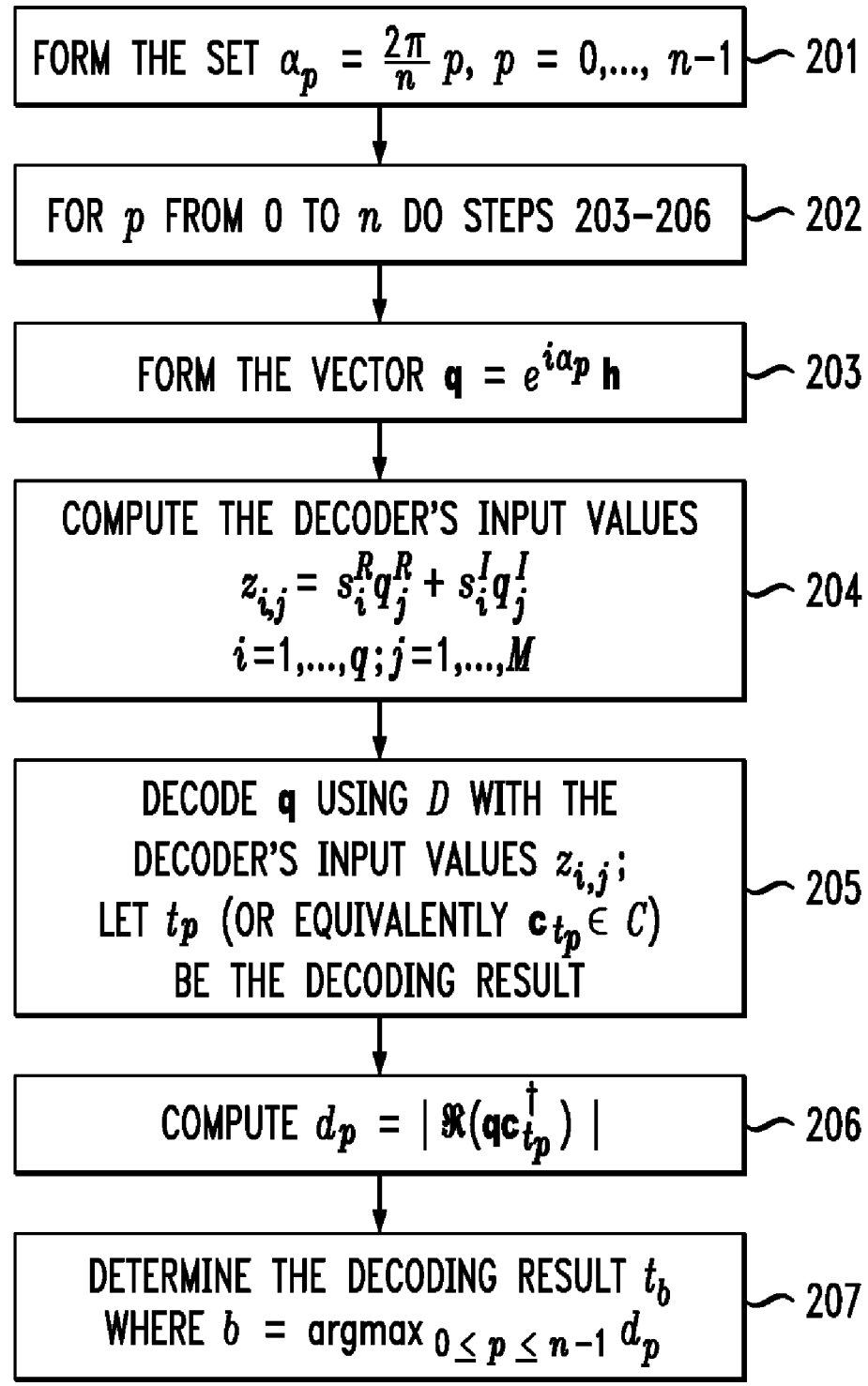
FIG. 2 shows a methodology for quantizing a complex vector according to an embodiment of the invention.

FIG. 2 shows a rotate and quantize decoding algorithm according to an embodiment of the invention. Decoding algorithm 200 is performed by each of the terminals (104-1 through 104-K in FIG. 1).

Step 201: Form the finite set $\alpha_p = 2\pi/n$ p, p=0, ..., n−1.
Step 202: For p from 0 to n do steps 203-206.
Step 203: Form the vector $q = e^{i\alpha_p} h$ (where q may be considered a scaled version of h).
Step 204: Compute the decoder's input values:

$$z_{i,j} = s_i^R q_j^R + s_i^I q_j^I$$

i=1, ..., q; j=1, ..., M.

Step 205: Decode q using D with the decoder's input values $z_{i,j}$ and let $t_p$ (or equivalently $c_{t_p} \in C$) be the decoding result.
Step 206: Compute $d_p = |\Re(qc_{t_p}^\dagger)|$.
Step 207: Determine the decoding result $t_b$ where $b = \arg\max_{0 \leq p \leq n-1} d_p$.

The value n is a decoding parameter. The larger n, the closer decoding algorithm 200 is to the ML decoding represented by equation (1).

Note that if D is the Viterbi algorithm, then at step 205, we conduct the Viterbi decoding with the trellis branch metrics $z_{i,j}$.

Let us consider an example.

Example 2. Let V and C be the same as in Example 1. Let h=(1,i,2), n=4, and let D be any ML decoding of V. Then for p=0, ..., 3 we have the following values at steps 203-206 of algorithm 200:

$$p = 0: q = (1, i, 2), \text{ values } z_{i,j} \text{ are } \begin{matrix} 1 & 0 & 2 \\ 0 & 1 & 0 \\ -1 & 0 & -2 \\ 0 & -1 & 0 \end{matrix}$$

$$t_0 = 1, d_0 = 3$$

$$p = 1: q = (i, -1, 2i), \text{ values } z_{i,j} \text{ are } \begin{matrix} 0 & -1 & 0 \\ 1 & 0 & 2 \\ 0 & 1 & 0 \\ -1 & 0 & -2 \end{matrix}$$

$$t_1 = 3, d_1 = 2$$

$$p = 2: q = (1, -1, -2), \text{ values } z_{i,j} \text{ are } \begin{matrix} 1 & 0 & -2 \\ 0 & -1 & 0 \\ 1 & 0 & 2 \\ 0 & 1 & 0 \end{matrix}$$

$$t_2 = 1, d_2 = 3$$

$$p = 1: q = (-i, 1, 2i), \text{ values } z_{i,j} \text{ are } \begin{matrix} 0 & 1 & 2 \\ 1 & 0 & -2 \\ 0 & -1 & 0 \\ 1 & 0 & 2 \end{matrix}$$

$$t_3 = 3, d_3 = 2$$

Thus, at step 207 of the algorithm, we have b=0 and $t_0=1$.

Note that computations according to equation (1) give the same results.

Figure 3:
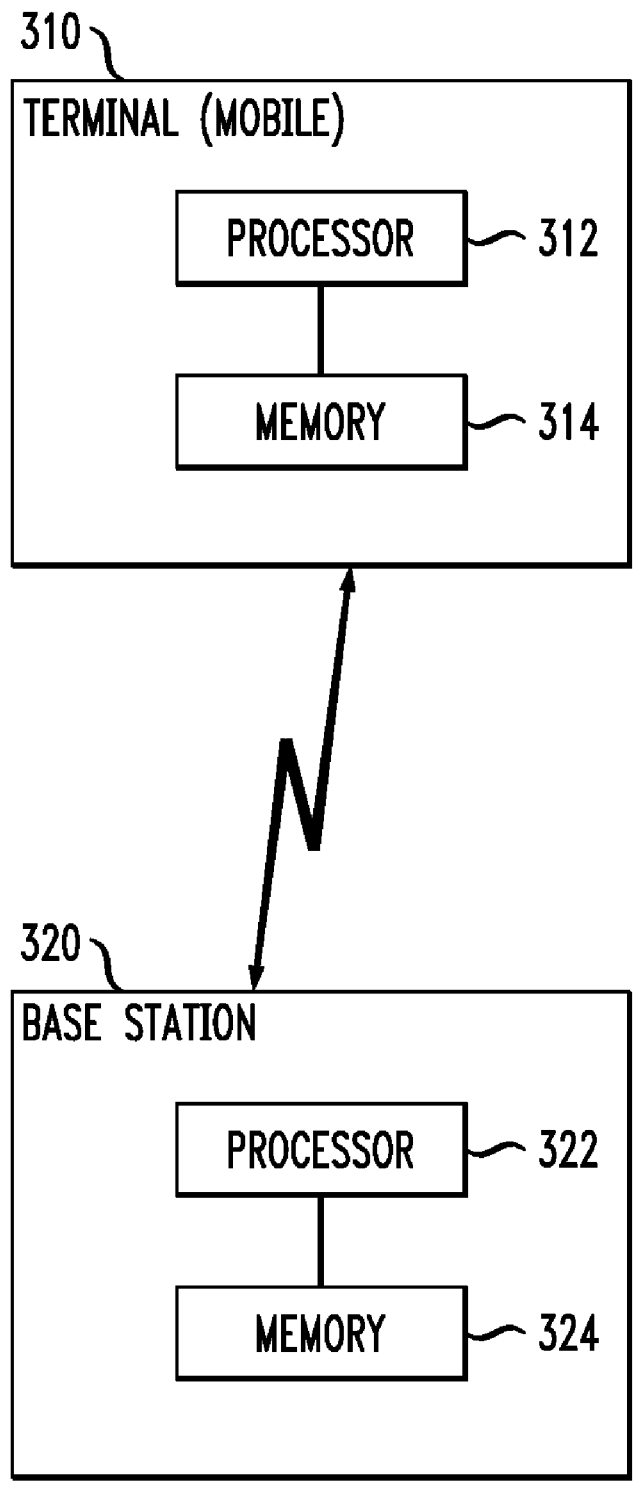
FIG. 3 shows a processing architecture for implementing a methodology for quantizing a complex vector according to an embodiment of the invention.

FIG. 3 shows a processing architecture for implementing a methodology for quantizing a complex vector according to an embodiment of the invention. More particularly, FIG. 3 shows a more detailed view of one possible configuration of MIMO broadcast system 300 including terminal 310 and base station 320. Note that only one terminal is shown for the sake of simplicity. Terminal 310 corresponds to one of terminals 104-1 through 104-K in FIG. 1, while base station 320 corresponds to base station 102 in FIG. 1. In this embodiment, terminal 310 includes processor 312 and memory 314, while base station 320 includes processor 322 and memory 324. Omitted from the figure for clarity of illustration are transceiver circuitry and antennas.

One or more software programs for implementing complex vector decoding as described herein may be stored in memory 314 and executed by processor 312. Memory 314 may therefore be considered a processor-readable storage medium. Processor 312 may include multiple integrated circuits, digital signal processors or other types of processing devices, and associated supporting circuitry, in any combination. Of course, numerous alternative arrangements of hardware, software or firmware in any combination may be utilized in implementing terminal 310 or particular elements thereof. Similarly, processor 322 and memory 324 may be implemented as described above in order to perform the functions of the base station.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
   obtaining at least one complex vector representative of at least one element of a communication system; and
   identifying a codeword that approximates the complex vector, the identified codeword being a codeword, from a set of codewords, wherein a real part of a product of the codeword and a scaled version of the complex vector is about maximal over the set of codewords, and wherein the scaled version of the complex vector is the product of the complex vector and a constant from a set of constants;
   wherein the obtaining and identifying steps are performed via a processor and a memory.

2. The method of claim 1, wherein the identifying step further comprises:
   for each constant in the set of constants, computing a vector as a product of the constant and the complex vector;
   for each computed vector, computing input values to a selected decoding algorithm, wherein the computed input values are real;
   for each set of input values, executing the selected decoding algorithm to generate a decoding result; and
   determining a maximal decoding result from decoding results of each of the sets of input values, wherein the codeword that approximates the complex vector is identified as the codeword associated with the maximal decoding result.

3. The method of claim 1, wherein the element of the communication system that the complex vector represents is a channel between a base station and a user terminal in the communication system.

4. The method of claim 3, wherein the user terminal performs the complex vector obtaining step and the codeword identification step, and wherein the method further comprises the user terminal transmitting an index corresponding to the identified codeword to the base station.

5. The method of claim 4, wherein the base station utilizes the index to reconstruct the complex vector representative of the channel between the base station and the user terminal such that an information transmission rate between the base station and the user terminal is increased.

6. The method of claim 1, wherein the communication system comprises a multiple-input, multiple-output (MIMO) broadcast system.

7. The method of claim 1, wherein the set of constants comprises a finite number of values computed between 0 and $2\pi$.

8. The method of claim 1, wherein the complex vector obtaining step and the codeword identification step are performed by a quantizing decoder of a user terminal in the communication system.

9. An article of manufacture comprising a processor-readable storage medium storing one or more software programs which when executed by the processor perform the steps of the method of claim 1.

10. A method, comprising:
    generating a codebook comprising codewords, wherein a codeword in the codebook is identifiable as an approximation of a complex vector representative of at least one element of a communication system when a real part of a product of the codeword and a scaled version of the complex vector is about maximal over the codebook, wherein the scaled version of the complex vector is the product of the complex vector and a constant from a set of constants; wherein the generating step is performed via a processor and a memory.

11. The method of claim 10, wherein the codebook is stored in at least one user terminal in the communication system such that the codebook is usable by the user terminal to decode the complex vector which represents a channel between a base station in the communication system and the user terminal.

12. The method of claim 11, wherein the user terminal decodes the complex vector by identifying the codeword in the codebook that approximates the complex vector.

13. The method of claim 12, wherein the user terminal transmits an index corresponding to the identified codeword to the base station.

14. The method of claim 10, wherein the communication system comprises a multiple-input, multiple-output (MIMO) broadcast system.

15. The method of claim 10, wherein the set of constants comprises a finite number of values computed between 0 and $2\pi$.

16. Apparatus, comprising:
    a memory; and
    a processor coupled to the memory and operative to: (i) obtain at least one complex vector representative of at least one element of a communication system; and (ii) identify at least one codeword that approximates the complex vector representative of the communication system element, wherein the identified codeword is a codeword, from a set of codewords, wherein a real part of a product of the codeword and a scaled version of the complex vector is about maximal over the set of codewords, wherein the scaled version of the complex vector is the product of the complex vector and a constant from a set of constants.

17. The apparatus of claim 16, wherein the element of the communication system that the complex vector represents is a channel between a base station and a user terminal in the communication system.

18. The apparatus of claim 17, wherein the processor and the memory are resident in the user terminal in the communication system.

19. The apparatus of claim 18, wherein the processor resident in the user terminal is further operative to transmit an index corresponding to the identified codeword to a processor resident in the base station such that the processor resident in base station utilizes the index to reconstruct the complex vector for use in increasing an information transmission rate between the base station and the user terminal.

20. The apparatus of claim 16, wherein the communication system comprises a multiple-input, multiple-output (MIMO) broadcast system.

* * * * *